United States Patent [19]

Ward

[11] Patent Number: 4,572,778
[45] Date of Patent: Feb. 25, 1986

[54] HYDROPROCESSING WITH A LARGE PORE CATALYST

[75] Inventor: John W. Ward, Yorba Linda, Calif.

[73] Assignee: Union Oil Company of California, Los Angeles, Calif.

[21] Appl. No.: 572,692

[22] Filed: Jan. 19, 1984

[51] Int. Cl.$^4$ .................. C10G 45/08; C10G 67/02
[52] U.S. Cl. ..................... 208/89; 208/216 PP; 208/251 H
[58] Field of Search ............... 208/89, 216 PP, 251 H

[56] References Cited

U.S. PATENT DOCUMENTS

| | | | |
|---|---|---|---|
| 3,684,688 | 8/1972 | Roselius | 208/50 |
| 3,860,510 | 1/1975 | Henke et al. | 208/61 |
| 3,891,541 | 6/1975 | Oleck et al. | 208/89 |
| 3,998,722 | 12/1976 | Mayer et al. | 208/112 |
| 4,022,682 | 5/1977 | Bludis et al. | 208/89 |
| 4,069,139 | 1/1978 | Riley et al. | 208/216 PP |
| 4,179,355 | 12/1979 | Frayer et al. | 208/89 |
| 4,191,635 | 3/1980 | Quick et al. | 208/89 |
| 4,267,033 | 5/1981 | Heck et al. | 208/216 PP |
| 4,328,127 | 5/1982 | Angevine et al. | 208/216 PP |
| 4,340,466 | 7/1982 | Inooka | 208/210 |
| 4,404,097 | 9/1983 | Angevine et al. | 208/210 |
| 4,421,633 | 12/1983 | Shih et al. | 208/59 |
| 4,422,960 | 12/1983 | Shiroto et al. | 502/206 |
| 4,427,534 | 1/1984 | Brunn et al. | 208/89 |
| 4,431,526 | 2/1984 | Simpson et al. | 208/211 |
| 4,460,707 | 7/1984 | Simpson | 502/315 |

*Primary Examiner*—John Doll
*Assistant Examiner*—O. Chaudhuri
*Attorney, Agent, or Firm*—Dean Sandford; Gregory F. Wirzbicki; Alan H. Thompson

[57] ABSTRACT

Hydroprocessing of hydrocarbon oils is carried out utilizing a catalyst containing nickel and tungsten active metal components on a porous support material and having a narrow pore size distribution, with essentially all pores being of diameter greater than about 100 angstroms, with less than about 10 percent of the total pore volume being in pores of diameter greater than 300 angstroms, and with at least about 60 percent of the total pore volume being in pores of diameter from about 180 to about 240 angstroms. The catalyst is useful for promoting the conversion of asphaltenes contained in hydrocarbon oils, especially in the second reaction zone of a multiple-stage hydrodesulfurization process wherein demetallization catalysts are employed in upstream reaction zones.

41 Claims, No Drawings

HYDROPROCESSING WITH A LARGE PORE CATALYST

BACKGROUND OF THE INVENTION

1. Field of the Invention

This invention relates to catalysis, and particularly to hydrocarbon hydroprocessing catalysts, such as those utilized to catalyze the reaction of hydrogen with organosulfur, organonitrogen, organometallic and asphaltene compounds. More particularly, this invention relates to a hydroprocessing catalyst and a process for utilizing the catalyst for hydrodesulfurizing, hydrodemetallizing and converting asphaltene compounds in hydrocarbon liquids.

2. Description of the Prior Art

In a typical catalytic hydrocarbon refining process, contaminant metals and coke from a hydrocarbon oil deposit on porous refining catalysts, causing a gradual loss of catalytic activity and/or selectivity for yielding an intended product. Residual petroleum oil fractions, such as the heavy fractions produced in atmospheric and vacuum crude distillation columns, are especially undesirable as feedstocks for most catalytic refining processes due to their high metals, asphaltene and sulfur content. Economic considerations, however, have recently provided new incentives for catalytically converting the heavy fractions to more marketable products.

Methods are available to reduce the sulfur, metals and asphaltene content of residua. One such method is hydrodesulfurization, a process wherein a residuum, usually containing the bulk of the asphaltene components of the original crude from which the residuum was derived, is contacted with a catalyst usually containing hydrogenation metals on a porous support material under conditions of elevated temperature and pressure and in the presence of hydrogen such that the sulfur components are converted to hydrogen sulfide, and the asphaltene components to lower molecular weight molecules while coke and metals are simultaneously deposited on the catalyst. However, the deposition of coke and contaminant metals on the catalyst causes deactivation of the catalyst, and, in the usual instance, the extent of deactivation is a function of the amount of coke and/or metals deposition on the catalyst surface, i.e., the usefulness of the catalyst steadily decreases as the amount of deposited coke and/or metals increases with continued treatment of the residuum.

It has been recognized that typical hydroprocessing catalysts, especially those utilized for hydrodesulfurization purposes, have specific pore size characteristics effective for catalytic processing of residuum. For example, a catalyst employed in a two-catalyst hydrodesulfurization process ordinarily includes at least one desulfurization catalyst having a sizable number of pores of diameter less than 100 angstroms. Although such a catalyst often exhibits high desulfurization activity, its useful life is manifestly short in the absence of a catalyst promoting metals removal. Conversely, many catalysts exhibiting a suitable degree of demetallation activity tend to have a sizable number of pores having a diameter greater than 300 angstroms. The hydrodesulfurization processes disclosed in U.S. Pat. Nos. 3,819,509 and 3,901,792 are typical of those employing a catalyst having relatively small pore characteristics (i.e., some pore diameters less than 100 angstroms) for desulfurization and a second relatively large pore catalyst additionally promoting metals removal.

Although conventional catalysts, including those containing both large pores (i.e., greater than 300 angstroms pore diameters) and small pores (i.e., less than 100 angstroms pore diameters) are somewhat active and stable for hydrocarbon conversion reactions, catalysts of yet higher activities and stabilities are still being sought. Increasing the activity of a catalyst increases the rate at which a chemical reaction proceeds under given conditions, and increasing the stability of a catalyst increases its resistance to deactivation, that is, the useful life of the catalyst is extended. In general, as the activity of a catalyst is increased, the conditions required to produce a given end product, such as a hydrocarbon of given sulfur, asphaltene, and/or contaminant metals content, become more mild. Milder conditions require less energy to achieve the desired product, and catalyst life is extended due to such factors as lower coke formation or the deposition of less metals.

Presently, conventional catalysts employed to promote hydrodesulfurization of a hydrocarbon oil tend to have limited capability for also converting asphaltenes to less complex components. Although such conventional catalysts may be active for removing sulfur, the useful life of such catalysts may be relatively short when high demetallization activity and/or asphaltene conversion is also emphasized.

A need still exists for a process employing a highly active hydroprocessing catalyst with an extended useful life to promote hydrocarbon conversion reactions, particularly hydrodesulfurization, hydrodemetallization and/or hydroconversion of asphaltenes.

Accordingly, it is an object of the present invention to provide a catalytic hydrocarbon conversion process that promotes the upgrading of a hydrocarbon oil, particularly with respect to converting asphaltenes to lower molecular weight molecules in addition to removal of sulfur compounds.

It is another object to provide a process for hydrodesulfurizing a hydrocarbon oil while maintaining a high degree of asphaltene conversion.

It is still another object of the invention to provide a process employing a catalyst for hydroconverting asphaltenes in a hydrocarbon oil and, specifically, to provide a hydrocarbon conversion process employing a catalyst with high activity and stability for converting asphaltenes to materials that can be subsequently more effectively converted to lower molecular weight product hydrocarbons.

It is a further object of the invention to provide novel processes for the hydrodemetallization, hydrodesulfurization and hydroconversion of asphaltenes found in heavy hydrocarbon oil fractions such as residua.

It is an object of the invention to provide a multistage hydrocarbon conversion process, and more particularly, to provide for the hydrodesulfurization of a residuum hydrocarbon oil by contacting the oil with a demetallization catalyst, followed by contact with a catalyst having high activity and a long useful life with respect to asphaltene conversion in addition to sulfur removal, and then contacted with a cracking catalyst.

These and other objects and advantages of the invention will become apparent from the following description.

SUMMARY OF THE INVENTION

The present invention is directed to a process for the catalytic hydroprocessing of a hydrocarbon oil wherein the hydrocarbon oil is contacted under reaction conditions with a catalyst having a narrow pore size distribution wherein essentially all the pores are of diameter greater than 100 angstroms, less than 10 percent of the total pore volume is in pores of diameter greater than 300 angstroms, and at least about 60 percent of the total pore volume is in pores of diameter between about 180 and about 240 angstroms. The catalyst contains nickel and tungsten active metal components on a porous support material usually containing alumina. Ordinarily, the process is utilized to enhance the conversion of asphaltenes in a hydrocarbon oil.

In one embodiment, a catalyst employed in the hydroconversion of asphaltenes in a hydrocarbon oil has a surface area between about 100 m$^2$/gram and about 200 m$^2$/gram and at least 30 percent of the pore volume in pores of diameter greater than about 200 angstroms. In another embodiment, a multi-stage hydrocarbon conversion process involving a sulfur, asphaltene and metals-containing hydrocarbon oil employs, in a first reaction zone, a catalyst having high activity for metals removal and a long useful life, in a second reaction zone, employs a nickel-tungsten catalyst with a narrow pore size distribution that is highly active and stable for converting asphaltenes and, in a third reaction zone, employs a catalyst having high activity for cracking hydrocarbon oils.

DETAILED DESCRIPTION OF THE INVENTION

The invention is directed to a process for the catalytic hydroprocessing of a hydrocarbon oil with a catalyst comprising active metals on a support, and more preferably, with hydrodesulfurization catalysts comprising nickel and tungsten active metal components on a support material, usually comprising a porous refractory oxide. The catalyst employed in the process of the invention is particularly well suited for hydrodesulfurization wherein the desired result is desulfurization coupled with a high degree of hydroconversion of asphaltenes and/or hydrodemetallation of a hydrocarbon oil usually containing a high content of metallic contaminants, asphaltenes and sulfur.

Support materials useful in the present hydroprocessing catalysts include silica, magnesia, silica-magnesia, zirconia, silica-zirconia, titania, silica-titania, allophane, attapulgite, bauxite, halloysite, sepiolite, clays and red mud. Mixtures of the foregoing materials are also contemplated, especially when prepared as homogeneously as possible. The preferred support material is a porous refractory oxide comprising aluminum and is usually selected from the group consisting of alumina, lithium-alumina, phosphorus-alumina, lithium-phosphorus-alumina, and silica-alumina. When employed in the preparation of catalysts promoting hydrocarbon conversion processes such as hydrodesulfurization, hydrodemetallization and hydroconversion of asphaltenes, transition aluminas such as gamma alumina, delta alumina and theta alumina are highly preferred refractory oxides. It is most highly preferred that the porous refractory oxide contain at least about 90 and, even more preferably, at least about 95 weight percent of gamma alumina.

The support material is usually prepared in the form of shaped particulates by methods well known in the art, with the preferred method being to extrude a precursor of the desired support, as for example, an inorganic refractory oxide gel such as a spray-dried or peptized alumina gel, through a die having openings therein of desired size and shape, after which the extruded matter is cut into extrudates of desired length. The average length of the particles is at least that of the cross-sectional diameter, with the cross-sectional diameter herein being considered as the longest dimension on the cross-section taken perpendicular to the longest axis of symmetry of the particle. Preferred refractory oxide particles have cross-sectional shapes that are cylindrical or have protrusions (lobes) from a central area, such as polylobes. The cross-sectional diameter of the particles is usually about 1/100 to about ⅛ inch, preferably about 1/40 to about 1/12 inch and most preferably about 1/32 to about 1/15 inch. Among the preferred refractory oxide particles, at least for hydroprocessing, are those having cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and about 0.04 inch. More preferred particulates are those having cross-sectional shapes that are quadralobal, as in FIG. 10 of U.S. Pat. No. 4,028,227, and most preferably, an asymmetrical quadralobal cross-sectional shape.

Support particles prepared by the foregoing or equivalent procedures may be precalcined, especially if gamma alumina is the chosen support material. Temperatures above about 900° F. are usually required to convert alumina gel or hydrated alumina particulates to bamma alumina. Typically, temperatures between about 1,100° F. and 1,500° F. are utilized to effect this transformation to gamma alumina, and higher temperatures to form delta and theta alumina, with holding periods of ¼ to 3 hours generally being effective.

Physical characteristics of the support particles utilized to prepare the catalyst employed in the process of the invention typically include a narrow pore size distribution wherein essentially all the pores of diameter greater than 100 angstroms, less than about 10 percent of the total pore volume is in pores of diameter greater than 300 angstroms, and at least about 60 percent, preferably at least about 65 percent, of the total pore volume is in pores of diameter distributed over a narrow range of about 60 angstroms within the 100 angstrom range of about 140 to about 240 angstroms, as determined by conventional mercury porosimeter testing methods.

Since the present catalysts require at least 60 percent of their pore volume to be in pores of 180 to 240 angstrom diameter, it will be seen from the foregoing that, in the preparation of the catalysts of the present invention, the support particles may initially have a similar distribution of pore volume as the final catalyst, but such is not necessary or critical. As will be shown hereinafter in Example I, the support particles may have, for example, at least 60 percent of their pore volume in pores of 140 to 200 angstrom diameter and yet still, due to the subsequent impregnations, calcinations and other catalyst preparational steps hereinafter discussed, yield a final catalyst having, as required herein, at least 60 percent of the pore volume in pores of 180 to 240 angstrom diameter.

Other characteristics of supports utilized herein include a total pore volume, an average pore diameter and surface area large enough to provide substantial space and area to deposit the active metal components. The total pore volume of the support, as measured by the conventional mercury/helium differential density method, is usually about 0.5 to about 2.0 cc/gram, preferably about 0.5 to about 1.5 cc/gram and most preferably about 0.7 to about 1.1 cc/gram. The average pore diameter of the support is usually greater than about 160 angstroms, and preferably from about 160 to about 220 angstroms. Additionally, the surface area (as measured by the B.E.T. method) of the support particles is above about 100 m²/gram, usually from about 100 m²/gram to about 300 m²/gram and preferably about 125 m²/gram to about 275 m²/gram.

Support particles having the preferred physical characteristics disclosed herein are available from Nippon-Ketjen Catalyst Division of Axo-Chemie.

To prepare the hydroprocessing catalyst, the support material is compounded, as by impregnation of calcined support particles, with one or more precursors of a catalytically active metal or metals. The impregnation may be accomplished by any method known in the art, as for example, by spray impregnation wherein a solution containing the metal precursors in dissolved form is sprayed onto the support particles. Another method is the circulation or multi-dip procedure wherein the support material is repeatedly contacted with the impregnating solution with or without intermittent drying. Yet another method involves soaking the support in a relatively large volume of the impregnation solution, and yet one more method, the preferred method, is the pore volume or pore saturation technique wherein support particles are introduced into an impregnation solution of volume just sufficient to fill the pores of the support. On occasion, the pore saturation technique may be modified so as to utilize an impregnation solution having a volume between 10 percent less and 10 percent more than that which will just fill the pores.

If the active metal precursors are incorporated by impregnation, a subsequent or second calcination as, for example, at temperatures between 750° F. and 1,400° F., converts the metals to their respective oxide forms. In some cases, subsequent calcinations may follow the impregnation of individual active metals. Subsequent calcinations, however, may be avoided in alternative embodiments of the invention as, for example, by co-mulling the active metals with the support material rather than impregnating the metals thereon. In comulling, the precursor of the support material, usually in a hydrated or gel form, is admixed with precursors of the active metal components, either in solid form or in solution, to produce a paste suitable for shaping by known methods, e.g., pelleting, extrusion, etc. A subsequent calcination yields a hydroprocessing catalyst containing the active metals in their respective oxide forms.

When the hydroprocessing catalyst is prepared by the foregoing or equivalent methods, at least one active metal component is selected from the group consisting of nickel and tungsten. Preferably, the catalyst contains both nickel and tungsten. Nickel and tungsten in combination are highly preferred for hydroconversion of asphaltene compounds. The hydroprocessing catalyst contains up to about 10, usually from 1 to 8 percent and preferably from 2 to 6 percent by weight of nickel components, calculated as the monoxide, and up to about 30, usually from about 3 to about 28 percent and preferably from 8 to 26 percent by weight of tungsten components, calculated as the trioxide.

In accordance with the invention, a hydroprocessing catalyst is prepared so as to have a narrow pore size distribution wherein essentially all the pores are of diameter greater than about 100 angstroms, less than about 10 percent of the total pore volume is in pores of diameter greater than about 300 angstroms and at least about 60 percent, preferably at least about 65 percent, of the total pore volume is in pores of diameter from about 180 to about 240 angstroms. Typically the catalyst contains at least about 20, preferably at least about 30, and most preferably at least about 40 percent of the pore volume in pores of diameter greater than about 200 angstroms. Other physical properties of the catalyst typically include a total pore volume of usually less than about 1.2 cc/gram and a surface area greater than about 100 m²/gram, with both properties determined by the conventional methods previously disclosed herein. Physical characteristics of the typical, preferred, and most preferred catalyst employed in the process of the invention are summarized in Table I.

TABLE I

PHYSICAL CHARACTERISTICS OF CATALYST

| Pore Size Distribution | % of Total Pore Volume | | |
|---|---|---|---|
| | Typical | Preferred | Most Preferred |
| <100 | 0 | 0 | 0 |
| >140 | — | — | >95 |
| >150 | — | >90 | >90 |
| 180–240 | >60 | >65 | >70 |
| 180–220 | >30 | >40 | >50 |
| 200–300 | >20 | >30 | >40 |
| >240 | — | — | <25 |
| >300 | <10 | <10 | <10 |
| >500 | — | — | <6 |
| Average pore diameter, angstroms | >180 | 180–220 | 190–210 |
| Surface area, m²/gram | >100 | 100–200 | 110–190 |
| Total pore volume, cc/gram | 0.25–1.2 | 0.4–0.9 | 0.45–0.8 |
| Average crush strength, lbs/⅛ inch | >4 | >7 | >10 |

A highly preferred catalyst employed in the process of the invention contains about 2 to about 6 weight percent of nickel components, calculated as the monoxide, and from about 18 to about 26 weight percent of tungsten components, calculated as the trioxide, on a porous refractory oxide usually containing gamma alumina. Physical properties of this catalyst include a total pore volume of about 0.45 to about 0.75 cc/gram, a surface area between about 110 and 190 m²/gram and an average pore diameter from about 190 to about 210 angstroms.

An unusual porosity feature of the catalyst is the combination of at least three critical characteristics. First, the catalyst is prepared so that few, if any, small pores are present. Essentially all the pores of the catalyst are of diameter greater than about 100 angstroms (e.g., essentially no micropores less than about 100 angstroms), preferably more than about 90 percent of the total pore volume is in pores of diameter greater than 150 angstroms and most preferably more than about 95 percent of the total pore volume is in pores of diameter greater than about 140 angstroms. These relatively large pores in the catalyst provide essentially free access to the active catalytic sites for the large aromatic polycyclic molecules, such as asphaltenes, in which a substantial proportion of the metallic contaminants in hydrocarbon oil residua is usually contained. Second, less than 10 percent of the total pore volume of the catalyst is in pores of diameter greater than 300 angstroms, including preferably less than about 6 percent in pores of diameter greater than 500 angstroms, and more preferably less than 25 percent of the total pore volume being in pores of diameter greater than 240 angstroms. Minimizing the number of macropores (300 angstrom diameter or larger) in the catalyst contributes to maximizing the available surface area for active catalytic sites. Third, the catalyst has at least about 60 percent, preferably at least about 65 percent and most preferably at least about 70 percent of the total pore volume in pores of diameter in the range from about 180 angstroms to about 240 angstroms. Ordinarily, within the 180 to 240 angstrom range, the catalyst has at least about 20, preferably at least about 30, and most preferably at least about 40 percent of the pore volume in pores of diameter greater than 200 angstroms. Since such a large percentage of the pore volume is distributed in medium-sized pores of diameter from about 180 to about 240 angstroms, the number of macropores and micropores is substantially minimized so that the bulk of the available surface area is distributed in the medium-sized pores. It is theorized, at least for purposes of hydroconversion of asphaltenes, that the chemical properties of the support, as well as those of nickel and tungsten hydrogenation metal components, together with both the size and the substantial number of pores in the medium-size range, allow for both ready penetration into the catalyst by relatively large asphaltene molecules and conversion of a significant amount of sulfur- and asphaltene-containing molecules on the surface of each pore; the invention, however, is not limited to this or any other theory of operation.

Catalysts prepared for use in accordance with the invention are employed under hydroprocessing conditions suited for their intended purposes, as for example, in a process for upgrading hydrocarbon oils such as hydrocracking, hydrotreating, hydrodemetallization, hydrodesulfurization or hydroconversion of asphaltenes, with usual conditions being an elevated temperature above 600° F., a pressure above 500 p.s.i.g. and the presence of hydrogen. Such catalysts are also activated in accordance with methods suited to such catalysts. As an illustration, most hydroprocessing catalysts are more active, sometimes even far more active, in a sulfided or reduced form than in the oxide form in which they are generally prepared. Accordingly, hydroprocessing catalysts prepared for use in the process of the invention may be sulfided or reduced prior to use (in which case the procedure is termed "presulfiding" or "prereducing") by passing a sulfiding or reducing gas, respectively, over the catalyst prepared in the calcined form. Temperatures between 300° F. and 700° F. and space velocities between about 150 and about 500 v/v/hr are generally employed, and this treatment is usually continued for about two hours. Hydrogen may be used to prereduce the catalyst while a mixture of hydrogen and one or more components selected from the group consisting of sulfur vapor and the sulfur compounds (e.g., lower molecular weight thiols, organic sulfides, carbon disulfide and, especially, $H_2S$) is suitable for presulfiding. Generally speaking, the relative proportion of hydrogen in the presulfiding mixture is not critical, with any proportion of hydrogen ranging between 1 and 99 percent by volume being adequate.

If the catalyst is to be used in a sulfided form, it is preferred that a presulfiding procedure be employed. However, since many hydroprocessing catalysts are used to upgrade sulfur-containing hydrocarbons, as in hydrodesulfurization, one may, as an alternative, accomplish the sulfiding in situ, particularly with hydrocarbon oils containing about 1.0 weight percent or more of sulfur under conditions of elevated temperatures and pressure.

Preferably, the nickel-tungsten catalyst is employed in a process for the hydrodesulfurization of hydrocarbon oils, particularly where the process also emphasizes a high degree of hydroconversion of asphaltenes. The nickel-tungsten catalyst is usually employed as either a fixed or fluidized bed of particulates in a suitable reactor vessel wherein the oils to be treated are introduced and subjected to elevated conditions of pressure and temperature and a substantial hydrogen partial pressure, so as to effect the desired degree of desulfurization, denitrogenation, asphaltene conversion and demetallization. Most usually, the nickel-tungsten catalyst is maintained as a fixed bed with the oil passing downwardly therethrough. It is highly preferred that the catalyst be utilized in a train of several reactors required for severe hydrodesulfurization, as for example, in a multiple train reactor system having one or two reactors loaded with the nickel-tungsten catalyst and the remaining reactors with one or more other hydroprocessing catalysts. Alternatively, the nickel-tungsten catalyst may be loaded in a single reactor together with one or more other hydroprocessing catalysts, and typically in a volume ratio between about 1:10 and 10:1 nickel-tungsten catalyst to other hydroprocessing catalysts. The nickel-tungsten catalyst is employed alone or with other hydroprocessing catalysts in reactors that are generally operated under the same or an independent set of conditions selected from those shown in the following TABLE II:

TABLE II

| Operating Conditions | Suitable Range | Preferred Range |
| --- | --- | --- |
| Temperature, °F. | 500–900 | 600–850 |
| Hydrogen Pressure, p.s.i.g. | 500–3,500 | 1,000–2,500 |
| Space Velocity, LHSV | 0.05–3.0 | 0.1–1.5 |
| Hydrogen Recycle Rate, scf/bbl | 1,000–15,000 | 2,000–10,000 |

Contemplated for treatment by the process of the invention are hydrocarbon-containing oils, herein referred to generally as "oils," including broadly all liquid, liquid/solid and liquid/vapor hydrocarbon mixtures such as crude petroleum oils and synthetic crudes. Among the typical oils contemplated are topped crudes, vacuum and atmospheric residual fractions, heavy vacuum distillate oils, shale oils, oils from bituminous sands, coal compositions and the like, which contain sulfur and one or more of such contaminant metals as vanadium, nickel, iron, sodium, zinc and copper. Typically, sulfur and metals-containing hydrocarbon oils, preferably containing at least about 1 weight percent of sulfur and in excess of 2 ppmw of total contaminant metals, are treated in the process of the invention. Since the metallic poisons which deactivate hydrocarbon refining catalysts are generally associated with the asphaltene components of the oil, the process will be more commonly employed during the hydroprocessing of the higher boiling fractions (e.g., residua) in which the asphaltene components concentrate. The process of the invention is especially useful for treating oils containing between about 1 and 8 weight percent or more of sulfur, as for example, atmospheric and vacuum distillation residua which contain a substantial proportion of asphaltenes, typically greater than about one, and usually greater than about two weight percent of the oil. It is highly preferred that the process of the invention be used to treat a residuum, or treated fraction thereof, that contains greater than about 1.5 weight percent of asphaltenes and less than about 50 ppmw, and often less than about 25 ppmw, of contaminant metals. The typical residuum for treatment herein is high boiling (i.e., at least 95% of its constituents boil above about 600° F.) and often contains undesirable proportions of nitrogen, usually in a concentration between about 0.2 and 0.4% by weight. Such sulfur, nitrogen, asphaltene and metals-containing oils commonly have an API gravity less than about 30° and usually less than about 25°.

In a preferred embodiment of the invention, a hydrocarbon oil is successively passed through at least two reaction zones, each containing a different hydroprocessing catalyst, at a temperature of about 500° F. to about 900° F. and at a LHSV of about 0.05 to about 3.0 and in the presence of hydrogen at a partial pressure about 500 to about 3,500 p.s.i.g., employed at a recycle rate of about 1,000 to about 15,000 scf/bbl. Although the nickel-tungsten catalyst may be employed in either the first or second reaction zone, preferably it is utilized in the second reaction zone. The nickel-tungsten catalyst employed in the invention usually promotes a high degree of asphaltene conversion of the hydrocarbon oil while also maintaining a suitable degree of desulfurization and demetallization. Conversely, a first hydroprocessing catalyst, typically employed in a first reaction zone, is primarily employed to promote a high degree of demetallization in addition to partial sulfur removal and partial asphaltene conversion. The effluent from the first reaction zone typically contains about 5 to about 25 ppmw of contaminant metals, about 2 to about 10 weight percent of asphaltenes, and about 0.5 to about 2.0 weight percent of sulfur. After contact with the nickel-tungsten catalyst, the effluent hydrocarbon oil from the second reaction zone has a substantially reduced sulfur, asphaltene and contaminant metals content, the latter in a concentration less than about 25, preferably less than about 2, and most preferably less than about 1 ppmw (Ni+V). It is highly preferred that the effluent hydrocarbon oil from the second reaction zone contain less than about two, preferably less than about 1.5, and preferably less than about one weight percent of asphaltenes, and also contain less than about 1.5, and preferably less than about 0.5 weight percent of sulfur. The first catalyst typically contains one or more hydrogenation metal components, usually Group VIB and/or Group VIII metals, and preferably cobalt and/or molybdenum on a porous support material, usually a refractory oxide having essentially the same porosity characteristics as those of the nickel-tungsten catalyst disclosed herein.

In a preferred embodiment, a heavy hydrocarbon oil is successively passed through at least three reaction zones wherein a substantial amount of contaminant metals in the hydrocarbon oil is removed in the first reaction zone, a substantial proportion of asphaltenes is converted in the second reaction zone in the presence of the nickel-tungsten catalyst as disclosed herein, and further hydrocarbon conversion occurs in the third reaction zone, such as catalyzed reactions including cracking, hydrocracking, denitrogenation, desulfurization, fluid catalytic cracking (FCC) and the like, as well as uncatalyzed reactions such as coking, delayed coking, fluid coking, thermal cracking and the like. The hydrocarbon oil fed to the first reaction zone is usually an atmospheric or vacuum residuum containing at least about 50 ppmw of contaminant metals, greater than about one weight percent of sulfur and greater than about one weight percent of asphaltenes. The oil is first contacted with a catalyst under demetallizing reaction conditions including a temperature about 600° F. to about 850° F. and at a LHSV about 0.1 to about 3. The resultant product, containing less than about 20 ppmw of contaminant metals and more than about one weight percent each of sulfur and asphaltenes, is subsequently contacted with a second catalyst capable of removing asphaltenes, sulfur and contaminant metals. The second catalyst, containing nickel and tungsten metal hydrogenation components supported on alumina, has at least about 60 percent of the total pore volume in pores of diameter from about 180 to about 240 angstroms, essentially all its pore volume in pores of diameter greater than 100 angstroms, less than about 10 percent of its pore volume in pores of diameter greater than about 300 angstroms and a surface area from about 100 $m^2$/gram to about 200 $m^2$/gram. The hydrocarbon oil is contacted with both catalysts, in the two-stage operation, in the presence of hydrogen at a partial pressure about 1,000 to about 2,500 p.s.i.g. and employed at a recycle rate of about 2,000 to about 10,000 scf/bbl. The first catalyst usually contains one or more Group VIII metal components and/or one or more Group VIB metal components on a support material. The first catalyst often contains from about 11 to about 14 weight percent of molybdenum components and about 2.5 to about 5.5 weight percent of cobalt components; however, in one embodiment, the first hydroprocessing catalyst contains about 4 to about 8 weight percent of molybdenum components and less than about 4 weight percent of cobalt or nickel components. The support material usually contains a porous refractory oxide that was essentially all pores of diameter greater than 100 angstroms, with less than 10 percent of the total pore volume being in pores of diameter greater than 300 angstroms, and with at least about 60 percent of the total pore volume being in pores of diameter from about 180 to about 240 angstroms. The product hydrocarbon obtained from this two-stage process typically contains less than about 1.5, preferably less than one, and most preferably less than about 0.3 weight percent of asphaltenes, less than about 25, preferably less than about 2 ppmw of contaminant metals, and a reduced amount of sulfur as compared to the hydrocarbon oil feed to the first reaction zone, typically less than about 0.5 weight percent sulfur. Such a product hydrocarbon is then fed to a third reaction zone for further hydrocarbon conversion. For example, in the third reaction zone, the product may be contacted with a catalyst having a cracking component, such as a hydrocracking or fluid cracking catalyst under reaction conditions, or contacted with a hydrotreater. Also the third reaction zone may involve a thermal cracker or a coker. In some instances, when the product hydrocarbon from the two-stage operation (i.e. the hydrocarbon oil has undergone catalytic contact in the first and second reaction zones) contains excessive nitrogen and/or sulfur levels, it may be fed to a hydrotreater and contacted with a denitrogenation catalyst or fed to a desulfurization unit and contacted with a desulfurization catalyst prior to further downstream hydrocarbon conversion processing.

The invention is further illustrated by the following examples which are illustrative of specific modes of practicing the invention and are not intended as limiting the scope of the invention defined by the appended claims.

EXAMPLE I

Catalyst W, prepared for the process of the invention, is tested to determine its hydrodeasphalting activity against a reference catalyst consisting of particles of a commercially available catalyst.

Catalyst W is prepared as follows: 200 grams of alumina support particles having the physical characteristics summarized in TABLE III are impregnated with 220 ml of a 330 ml aqueous solution containing 110 grams of ammonium metatungstate (91 percent $WO_3$ by weight) and 72 grams of nickel nitrate $[Ni(NO_3)_2.6H_2O]$. After aging for one hour, the catalyst is dried at 110° C. and calcined at 930° F. in flowing air. A final catalyst is produced having a nominal composition as follows: 22.0 weight percent of tungsten components, calculated as $WO_3$, 4.0 weight percent of nickel components, calculated as NiO, with the balance comprising gamma alumina.

The reference catalyst is a commercially available desulfurization catalyst and is produced having a nominal composition as follows: 12.0 weight percent of molybdenum components, calculated as $MoO_3$, 4.0 weight percent of cobalt components, calculated as CoO, with the balance consisting essentially of silica-containing gamma alumina, the $SiO_2$ content being about 1.0 weight percent of the entire catalyst and about 1.2 weight percent of the support.

The final catalysts, W and the reference catalyst, and the alumina support from which Catalyst W is prepared, have the physical characteristics summarized in TABLE III.

TABLE III

PHYSICAL CHARACTERISTICS

| Pore Diameter, Angstroms | Reference Catalyst Pore Volume cc/gram | % of Total p.v. | Catalyst W Pore Volume cc/gram | % of Total p.v. | Alumina Support Pore Volume cc/gram | % of Total p.v. |
|---|---|---|---|---|---|---|
| <40 | ↑ | ↑ | 0 | 0 | 0 | 0 |
| 40–60 | .49 | 94 | 0 | 0 | 0 | 0 |
| 60–80 | ↓ | ↓ | 0 | 0 | 0 | 0 |
| 80–100 | ↓ | ↓ | 0 | 0 | 0 | 0 |
| 100–120 | ↑ | ↑ | 0 | 0 | .03 | 4 |
| 120–140 | .01 | 2 | .02 | 3 | .06 | 7 |
| 140–160 | ↓ ↑ | ↓ ↑ | .04 | 5 | .27 | 32 |
| 160–180 | .005 | 1 | .07 | 10 | .18 | 21 |
| 180–200 | ↓ | ↓ | .13 | 18 | .12 | 15 |
| 200–220 | ↑ | ↑ | .25 | 35 | .06 | 7 |
| 220–240 | .0025 | .5 | .10 | 14 | .04 | 4 |
| 240–260 | ↓ | ↓ | .03 | 4 | .01 | 2 |
| 260–280 | ↓ | ↓ | .01 | 1 | .015 | 1 |
| 280–300 | ↓ ↑ | ↓ ↑ | .015 | 2 | .005 | 1 |
| 300–400 | .0025 | .5 | .02 | 2 | .01 | 1 |
| 400–500 | ↓ | ↓ | 0 | 0 | .01 | 1 |
| >500 | .01 | 2 | .04 | 6 | .03 | 4 |
| Total Pore Volume | 0.52 | | 0.725 | | .84 | |
| Surface Area, m²/gram | 270 | | 140 | | 153 | |

Catalyst W and the reference catalyst are tested in an integrated, two-reactor process to determine their asphaltene hydroconversion activities. The catalysts, W and the reference, are each charged in separate runs to a second reactor located downstream of a first reactor containing a demetallization catalyst having a nominal composition of 12.0 weight percent of molybdenum components, calculated as $MoO_3$, 4.0 weight percent of cobalt components, calculated as CoO, with a balance of alumina, and having essentially the same porosity characteristics as Catalyst W. The two-reactor process is utilized to hydrodesulfurize, hydrodemetallize and hydrodeasphalt an Iranian atmospheric residua feedstock having the characteristics shown in TABLE IV below under the following conditions: 2,200 p.s.i.g. total pressure, 0.5 LHSV and a hydrogen rate of 10,000 SCF/B.

TABLE IV

FEEDSTOCK PROPERTIES

| Feed Description | Iranian Atmospheric Residua |
|---|---|
| Gravity, °API | 16.6 |
| Sulfur, wt % | 2.61 |
| Nitrogen, wt % | 0.347 |
| Vanadium, ppm | 113 |
| Nickel, ppm | 37 |
| Ash, ppm | 230 |
| Carbon Residue, D-189, wt % | 6.9 |
| Asphaltenes (UTM-86), wt % | 6.1 |
| Pour Point, °F. | +65 |
| ASTM D-1160 Distillation, °F. | |
| IBP | 505 |
| 5 | 627 |
| 10 | 682 |
| 20 | 753 |
| 30 | 820 |
| 40 | 872 |
| 50 | 942 |
| 60 | 1,033 |
| Max | 1,035 |
| Rec | 61.0 |

A portion of the feedstock is passed downwardly through each reactor and contacted with the described catalysts in a single-pass system with once-through hydrogen such that the effluent metals concentration from the first reactor is maintained at about 15 ppmw, and the asphaltene concentration from the effluent of the second reactor is maintained at less than about one weight percent. Although the conditions required to maintain the metals removal are identical in the first reactor during each run of 30 days, the calculated temperature required for the asphaltene conversion in the second reactor, as adjusted from actual operating reactor temperatures, is 790° F. for the reactor containing Catalyst W and 830° F. for the reactor containing the reference catalyst. Catalyst W is, therefore, about 40° F. more active than the reference catalyst.

Although particular embodiments of the invention have been described, it will be understood, of course, that the invention is not limited thereto since many obvious modifications can be made, and it is intended to include within this invention any such modifications as will fall within the scope of the invention as defined by the appended claims.

I claim:

1. A catalytic process wherein a hydrocarbon oil containing asphaltenes and less than 50 ppmw of contaminant metals is contacted under conditions of elevated temperature and pressure with a catalyst comprising nickel and tungsten active metal components on a porous support material comprising gamma alumina, said catalyst having at least about 60 percent of the total pore volume distributed in pores of diameter from about 180 to about 240 angstroms, with essentially all pores being of diameter greater than about 100 angstroms, and with less than about 10 percent of the total pore volume being in pores of diameter greater than 300 angstroms, said catalyst having a surface area greater than about 100 m²/gram, and wherein the effluent hydrocarbon oil contains less asphaltenes than said hydrocarbon oil.

2. The process defined in claim 1 wherein said catalyst has at least about 30 percent of said total pore volume in pores of diameter greater than about 200 angstroms.

3. The process defined in claim 1 wherein said catalyst consists essentially of nickel and tungsten active metal components.

4. The process defined in claim 1 wherein said catalyst has an average pore diameter greater than about 180 angstroms.

5. The process defined in claim 1 wherein said hydrocarbon oil is selected from the group consisting of topped crudes, vacuum and atmospheric residual fractions, heavy vacuum distillate oils, shale oils, oils from bituminous sands and coal compositions.

6. The process defined in claim 1 wherein said catalyst has greater than about 90 percent of the total pore volume in pores of diameter greater than about 150 angstroms.

7. The process defined in claim 1 wherein said hydrocarbon oil contains less than about 25 ppmw of contaminant metals, greater than about 2 weight percent of said asphaltenes and at least about 1 weight percent of sulfur.

8. The process defined in claim 1 wherein said effluent hydrocarbon oil contains less than about 1.5 weight percent of asphaltenes, less than about 2 ppmw of contaminant metals and less than about 1.0 weight percent of sulfur.

9. The process defined in claim 1 wherein said hydrocarbon oil contains sulfur and said effluent hydrocarbon oil contains less sulfur than said hydrocarbon oil.

10. The process defined in claim 1 wherein said effluent hydrocarbon oil contains less contaminant metals than said hydrocarbon oil.

11. The process defined in claim 1 wherein said conditions comprise the presence of hydrogen.

12. The process defined in claim 1 wherein said conditions include an elevated temperature above 600° F., a pressure above 500 p.s.i.g. and the presence of hydrogen.

13. The process defined in claim 1 wherein said hydrocarbon oil contains about 5 to about 25 ppmw of contaminant metals, about 2 to about 10 weight percent of asphaltenes and about 0.5 to about 2.0 weight percent of sulfur.

14. The process defined in claim 1 wherein said catalyst further comprises up to about 10 weight percent of nickel metal components, calculated as NiO, and up to about 30 weight percent of tungsten metal components, calculated as the WO₃.

15. The process defined in claim 1 wherein said catalyst has an average pore diameter from about 180 to about 220 angstroms and has at least about 30 percent of said total pore volume in pores of diameter greater than about 200 angstroms.

16. A catalytic process for hydroconverting asphaltenes in a hydrocarbon oil containing asphaltenes and less than 50 ppmw of contaminant metals wherein said hydrocarbon oil is contacted under conditions of elevated temperature and pressure with a catalyst comprising nickel and tungsten components on a porous refractory oxide support comprising gamma alumina, said catalyst prepared with a support having a narrow pore size distribution with essentially all pores being of diameter greater than about 100 angstroms, with less than about 10 percent of the total pore volume being in pores of diameter greater than 300 angstroms, and with at least about 60 percent of the total pore volume being in pores of diameter distributed over a narrow range of about 60 angstroms within the 100 angstrom range of about 140 to about 240 angstroms, said catalyst having a surface area greater than about 100 m²/gram, and wherein the effluent hydrocarbon oil contains less asphaltenes than said hydrocarbon oil.

17. The process defined in claim 16 wherein said support has a surface area from about 100 m²/gram to about 300 m²/gram.

18. The process defined in claim 16 wherein said support has an average pore diameter greater than about 160 angstroms.

19. The process defined in claim 16 wherein said catalyst comprises up to about 30 weight percent of said tungsten component, calculated as WO₃.

20. The process defined in claim 16 wherein said catalyst further comprises up to about 10 weight percent of said nickel component, calculated as NiO.

21. The process defined in claim 16 wherein said catalyst has at least about 20 percent of the total pore volume in pores of diameter greater than about 200 angstroms.

22. The process defined in claim 16 wherein said hydrocarbon oil is selected from the group consisting of topped crudes, vacuum and atmospheric residual fractions, heavy vacuum distillate oils, shale oils, oils from bituminous sands and coal compositions.

23. The process defined in claim 16 wherein said hydrocarbon oil contains sulfur and said effluent hydrocarbon oil contains less sulfur than said hydrocarbon oil.

24. The process defined in claim 16 wherein said effluent hydrocarbon oil contains less contaminant metals than said hydrocarbon oil.

25. The process defined in claim 16 wherein said effluent hydrocarbon oil contains less than about 25 ppmw of contaminant metals and less than about 2 weight percent of asphaltenes.

26. The process defined in claim 16 wherein said effluent hydrocarbon oil contains less than about 1 weight percent of asphaltenes.

27. A process for the catalytic hydroprocessing of a hydrocarbon oil containing contaminant metals, sulfur and asphaltenes, said process comprising successively contacting said oil in the presence of hydrogen under hydroprocessing conditions with a first hydroprocessing catalyst in a first reaction zone and wherein the resultant hydrocarbon product from said first reaction zone contains less than about 50 ppmw of contaminant metals and, subsequently contacting the resultant hydrocarbon product from said first reaction zone with a second hydroprocessing catalyst in a second reaction zone, said second hydroprocessing catalyst comprising hydrogenation metal components selected from the group consisting of nickel and tungsten on a support material comprising gamma alumina, said second hydroprocessing catalyst having essentially no pores of diameter less than about 100 angstroms, less than 10 percent of the total pore volume in pores of diameter greater than 300 angstroms, at least about 60 percent of the total pore volume in pores of diameter from about 180 to about 240 angstroms, and having a surface area greater than about 100 m²/gram, and wherein the effluent hydrocarbon oil of said second reaction zone contains less asphaltenes than said resultant hydrocarbon product from said first reaction zone.

28. The process defined in claim 27 further comprising contacting said effluent hydrocarbon oil from said second reaction zone with a hydrocarbon conversion catalyst in a third reaction zone.

29. The process defined in claim 28 wherein said hydrocarbon conversion catalyst promotes the process of cracking.

30. The process defined in claim 28 wherein said hydrocarbon conversion catalyst promotes the process of hydrocracking.

31. The process defined in claim 28 wherein said hydrocarbon conversion catalyst promotes the process of fluid catalytic cracking.

32. The process defined in claim 28 wherein said hydrocarbon conversion catalyst promotes the process of desulfurization.

33. The process defined in claim 28 wherein said hydrocarbon conversion catalyst promotes the process of denitrogenation.

34. The process defined in claim 27 further comprising passing the effluent hydrocarbon oil from said second reaction zone into a third reaction zone wherein a hydrocarbon conversion reaction results.

35. The process defined in claim 34 wherein said hydrocarbon conversion reaction comprises coking.

36. The process defined in claim 34 wherein said hydrocarbon conversion reaction comprises thermal cracking.

37. A process for the catalytic hydrodesulfurization of a metal-containing hydrocarbon residuum oil containing at least 1 weight percent of asphaltenes and at least about 1 weight percent of sulfur, said process comprising the steps of:
(1) contacting said oil in the presence of hydrogen under hydrodemetallization conditions with a hydrodemetallization catalyst comprising up to about 30 weight percent of molybdenum components, calculated as MoO₃, and up to about 10 weight percent of cobalt or nickel components, calculated as the monoxide, on a support comprising gamma alumina, said hydrodemetallization catalyst having essentially all the pores of diameter greater than about 100 angstroms, at least about 60 percent of the total pore volume being in pores of diameter from about 180 to about 240 angstroms, less than 10 percent of the total pore volume being in pores of diameter greater than about 300 angstroms and a surface area about 100 m²/gram to about 200 m²/gram and wherein the resultant hydrocarbon product contains less than about 50 ppmw of contaminant metals; and
(2) contacting at least a portion of the hydrocarbon product from said step (1) under reaction conditions with a second catalyst comprising about 18 to about 26 weight percent of tungsten components, calculated as WO₃, and about 2 to about 6 weight percent of nickel components, calculated as NiO, on a refractory oxide support comprising gamma alumina, said second catalyst having essentially all the pores of diameter greater than about 100 angstroms, with less than about 10 percent of the total pore volume being in pores of diameter greater than about 300 angstroms, at least about 60 percent of the total pore volume in pores of diameter from about 180 to about 240 angstroms and a surface area about 100 m²/gram to about 200 m²/gram, said second catalyst having an average pore diameter equivalent to the average pore diameter of said hydrodemetallization catalyst, so as to remove a substantial portion of the asphaltenes from said oil.

38. The process defined in claim 37 wherein said hydrodemetallization catalyst and said second catalyst both have an average pore diameter from about 190 to about 210 angstroms and both have at least about 30 percent of the total pore volume in pores of diameter greater than about 200 angstroms.

39. The process defined in claim 37 wherein said catalyst in step (1) contains about 4 to about 8 weight percent of said molybdenum components and up to about 4 weight percent of said cobalt or nickel components on said refractory oxide support.

40. A catalytic process for upgrading a residuum hydrocarbon oil containing contaminant metals, sulfur and asphaltenes, said process comprising the steps of:
(1) contacting said oil in the presence of hydrogen under hydrodemetallization conditions with a hydrodemetallization catalyst wherein the resultant hydrocarbon product contains less than about 5 ppmw of contaminant metals and more than 1 weight percent of asphaltenes;
(2) contacting at least a portion of the resultant hydrocarbon product from step (1) in the presence of hydrogen under reaction conditions with a catalyst comprising nickel and tungsten on a porous refractory oxide, said catalyst having essentially all of the pore volume in pores greater than about 100 angstroms, less than 10 percent of the total pore volume in pores of diameter greater than 300 angstroms, at least 60 percent of the total pore volume in pores of diameter from about 180 to about 240 angstroms and a surface area of about 100 m²/gram to about 200 m²/gram, and wherein the resultant product hydrocarbon contains less than about 1 ppmw of contaminant metals, less than about 1.5 weight percent of asphaltenes and less than about 0.5 weight percent of sulfur; and
(3) contacting at least a portion of the resultant hydrocarbon product from step (2) under reaction conditions with a fluid cracking catalyst to produce substantial middle distillate and gasoline hydrocarbon fractions.

41. The process defined in claim 40 wherein said residuum hydrocarbon oil contains greater than about 50 ppmw of contaminant metals, greater than about 1.5 weight percent of asphaltenes and about 1 to about 8 weight percent of sulfur.

* * * * *